(12) United States Patent
Ling et al.

(10) Patent No.: US 6,801,690 B1
(45) Date of Patent: Oct. 5, 2004

(54) GRATING-BASED WAVELENGTH SELECTIVE SWITCH

(75) Inventors: Peiching Ling, San Jose, CA (US); Wayne Lui, Fremont, CA (US); Jinliang Chen, Saratoga, CA (US); Jianjun Zhang, Cupertino, CA (US); Ming Xu, San Jose, CA (US)

(73) Assignee: Integrated Optics Communications Corp., Sunnyvale, CA (US)

( * ) Notice: Subject to any disclaimer, the term of this patent is extended or adjusted under 35 U.S.C. 154(b) by 0 days.

(21) Appl. No.: 10/780,964

(22) Filed: Feb. 18, 2004

Related U.S. Application Data

(63) Continuation-in-part of application No. 10/731,297, filed on Dec. 9, 2003.

(51) Int. Cl.$^7$ .............................. G02B 6/34; H04J 14/02
(52) U.S. Cl. ........................... 385/37; 385/42; 385/129; 385/130; 385/131; 398/84; 398/85; 398/87
(58) Field of Search .............................. 385/31, 37, 42, 385/129, 130, 131, 132; 398/84, 85, 87

(56) References Cited

U.S. PATENT DOCUMENTS

| | | | | |
|---|---|---|---|---|
| 5,581,642 A | * | 12/1996 | Deacon et al. | 385/15 |
| 5,652,817 A | * | 7/1997 | Brinkman et al. | 385/37 |
| 5,781,670 A | * | 7/1998 | Deacon et al. | 385/10 |
| 5,887,089 A | * | 3/1999 | Deacon et al. | 385/22 |
| 5,915,051 A | * | 6/1999 | Damask et al. | 385/16 |
| 6,549,708 B2 | * | 4/2003 | Worchesky et al. | 385/37 |
| 6,704,480 B2 | * | 3/2004 | Worchesky et al. | 385/37 |

\* cited by examiner

*Primary Examiner*—Brian M. Healy
(74) *Attorney, Agent, or Firm*—Bo-In Lin

(57) ABSTRACT

This invention discloses an optical device that includes a wavelength-selective optical transmission system. The wavelength-selective optical transmission system further includes a first waveguide for transmitting a multiplexed optical signal therethrough. The wavelength-selective optical transmission system further includes a second waveguide coupled to the first waveguide wherein a least one of the first and second waveguides having a set of wavelength-selective Bragg gratings disposed near a coupling section between the first and second waveguides. One of the first and second waveguides has an aspect ratio, i.e., a ratio of a thickness divided by a width, is no greater than 0.75.

30 Claims, 13 Drawing Sheets

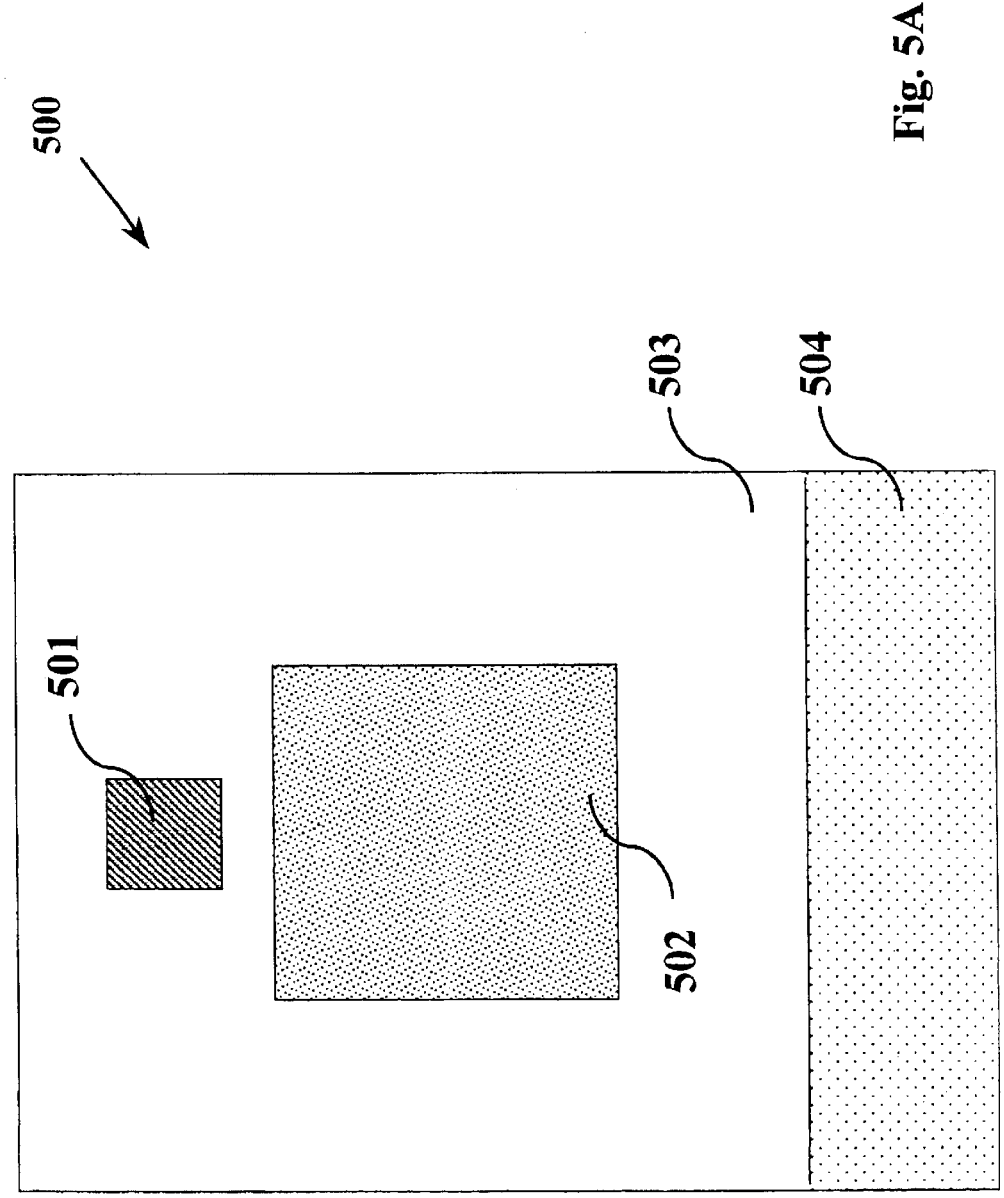

GRATING-BASED WAVELENGTH SELECTIVE SWITCH

This application is a CIP which claims priority to a pending U.S. patent application entitled IMPROVED GRATING-BASED WAVELENGTH SELECTIVE SWITCH, filed Dec. 9, 2003 by Ling et al. and accorded a Ser. No. 10/731,297, the benefit of its filing date being hereby claimed under Title 35 of the United States Code.

BACKGROUND OF THE INVENTION

1. Field of the Invention

This invention relates generally to technologies for switching and routing optical wavelengths. More particularly, this invention relates to innovative method, structures and processes to manufacture and design improved waveguide grating-based wavelength selective switches.

2. Description of the Related Art

Current state of the art in wavelength-selective optical switching based signal transmission systems are still limited by several performance deficiencies caused by crosstalk low coupling efficiency, and large size and poor form factors.

Due to the extremely wide transmission bandwidth allowed by optical fibers, all-optical fiber networks are increasingly being used as backbones for global communication systems. To fully exploit the fiber bandwidth in such networks, wavelength-division multiplexing (WDM) and wavelength-division demultiplexing (WDD) technologies are employed so that several independent optical signal streams may share the same fiber simultaneously, with the streams being distinguished by their center wavelengths. In the past, the adding, dropping, and cross connecting of individual optical signal in communication systems are done by first converting the optical signal into electrical signals. The electrical signals are manipulated electronically, which are then converted back into optical signals. However, the development of all-optical WDM communication systems has necessitated the need for all-optical wavelength selective devices. It is desirable for such devices to exhibit the properties of low insertion loss, insensitivity to polarization, good spectral selectivity, and ease of manufacturing.

There are three prevailing types of technologies commonly implemented now in the all-optical Dense WDM (DWDM) networks. (1) Thin Film Filter (TFF), (2) Arrayed Waveguide Gratings (AWG), and (3) Fiber Bragg Grating (FBG). Currently, TFF technology is the predominant choice when the channel spacing is greater than 100 GHz. The advantages of TFF-based devices are that they are relatively insensitive to temperature, have minimal cross talk, and provide good isolation between different wavelengths. However, devices built using current TFF technology have the following disadvantages: they are difficult to manufacture when the channel spacing is below 200 GHz; the packaging cost is very high; and the yield is low. Due to these disadvantages, when the channel spacing is 100 GHz or less, AWG and FBG wavelength selecting devices dominate the market. The advantages of AWG devices are they can support high channel counts, are easy to manufacture, and have a small footprint. Meanwhile, the disadvantages are that AWG devices are prone to cross talk and their packaging is complex. The second dominant technology, i.e., the FBG technology, has the advantages of short development time, low capital investment, and low packaging cost as channel spacing is reduced to 100 GHz or less. However, the FBG products available in the current market have relatively high loss. Moreover, each channel requires a circulator, which increases component costs and possibly increases packaging costs.

Furthermore, there are several optical switching technologies under development today. They are as follows: Micro Electro-Mechanical Systems (MEMS), Liquid Crystals, Thermal Optics, Holograms, Acousto-Optic, etc. Among all these optical switching technologies, MEMS is emerging to be the most promising technology, as benefited from its potential of batch processing and cheap replication, as well as its sound record on reliability in a wide range of applications. All the other technologies are still in the experimental stage and need years to become reliable enough for commercial applications. Different embodiments of MEMS optical switches are made available in the marketplace that are implemented with a de-multiplexing device to first separate the input signals into multiple channels (each having a specific central wavelength) transmitted over a specific waveguide. Optical switching operations are performed for each of these de-multiplexed signals. Then a device is employed to multiplex these switched signals for transmission over optical fibers. Alternately, the wavelength selective optical switches are implemented with a de-multiplexing device to first separate the optical signal into channels of different wavelengths. The optical switching operations are carried out for each channel and these channels are connected to optical output ports. Again, a de-multiplexing operation must be performed first before wavelength selective switching can be carried out.

There are two types of optical MEMS switch architectures under development, or commercially available: mechanical and micro-fluidic. Mechanical-type MEMS-based switches use arrays of miniaturized mirrors fabricated on a single chip. The optical signal is reflected off this tiny mirror in order to change the transmission channel. Micro-fluidic-type MEMS-based switches, on the other hand, have no moving mirrors. Rather, they rely on the movement of bubbles in micro-machined channels.

Mechanical-type MEMS-based switches can be further classified into two categories according to mirror movement: two-dimensional (2-D) switches and three-dimensional (3-D) switches. In 2-D switches, the mirrors are only able to execute a two-position operation that is, the mirrors can move either up and down or side by side. In 3-D switches, the mirrors can assume a variety of positions by swiveling in multiple angles and directions. These products (2-D switches or 3-D switches) are able to offer such benefits as excellent optical performance, minimal cross-talk, and the promise of improved integration, scalability, and reliability. On the other hand, these products and their methods of use are disadvantageous in the following aspects, First, in these switches, light travels through free space, which causes unbalanced power loss. Secondly, in order to steer each mirror, three to four electrodes need to be connected to each mirror, which is a major challenge to produce large-scale mechanical-type MEMS-based switches. Thirdly, alignment and packaging are difficult tasks particularly for large-scale switches.

While above-mentioned micro-mirror-based approach is widely taken by most major companies to build up their MEMS-based optical switches, Agilent Technology, Inc. has developed micro-fluidic-type MEMS based switches by combining its micro-fluidics and ink-jet printing technology. In these switches, an index-matching fluid is used to switch wavelengths. This fluid enables transmission in a normal condition. To direct light from an input to another output, a thermal ink-jet element creates a bubble in the fluid in a trench located at the intersection between the input waveguide and the desired output waveguide, reflecting the light by total internal reflection. The advantages of these switches are that they have no moving mechanical parts and are polarization independent. The disadvantages are their questionable reliability and the excessive insertion loss for large-scale switches.

A common drawback of both of these MEMS-based switches is the requirement to work with external de-multiplexing and re-multiplexing devices in order to function properly in an optical networking system. The requirements of implementing de-multiplexing and re-multiplexing functions add tremendous complexities to the system configuration and significantly increase the cost of manufacture, system installation, and maintenance of the optical network systems. Another drawback is that these prior-art switching systems are not wavelength selective switches. In another words, switching systems based on MEMS cannot selectively switch a particular wavelength from an input waveguide to a desired output waveguide. In short, they are not wavelength intelligent devices.

To add wavelength intelligence to optical switches, Bragg grating has been shown to have excellent wavelength selection characteristics. A Bragg grating behaves as a wavelength-selective filter, reflecting a narrow band of wavelengths while transmitting all other wavelengths. However, since switching optical signals requires routing of the optical transmission, a wavelength-selective filter alone is not sufficient to build an optical switch. In most waveguide grating device designs, since input signal and its reflective response occur within the same waveguide (see FIG. 1), circulators must be employed. One of the drawbacks of using circulators is that the circulators are expensive thus unduly increasing the implementation cost. For that reason, the grating assisted directional couplers such as those shown in FIG. 2 are used. The optical performance characteristics of grating assisted directional couplers and their dependence on material properties of the transmission medium are well-known, e.g., "Contra-directional coupling in grating-assisted guided-wave devices," Hong et al, *IEEE Journal of Lightwave Technology*, pp. 873, vol. 10, no. 7, July 1992. Typically, four distinct wavelengths participate in the coupling process. Among these four wavelengths, only three of them are significant in our discussion. These 3 wavelengths are illustrated in FIGS. 3A to 3C. As shown in these drawings, the first response is reflection along the incident direction, the second response is reflection along the coupling waveguide (contra-directional propagation) and the third response is the forward transmission along the coupling waveguide (co-directional propagation). Based on the utilizations of these optical responses between the grating assisted coupling waveguides, many different devices according to different combination of configurations are disclosed for varieties of application in controlling, switching and managing signal transmissions in optical networks.

Specifically, Horita et al. disclosed in U.S. Pat. No. 5,859,941, entitled "Optical Add/Drop Multiplexer Device," an add/drop multiplexer device provided to extract or inserting optical signals or arbitrary wavelength and having a wavelength selection characteristic with a narrow bandwidth. The multiplexer device is formed on a substrate implemented with a layered structure. In another U.S. Pat. No. 6,567,573, entitled "Switchable Optical Components" issued on May 20, 2003, Domash et al. disclosed electrically switchable Bragg grating devices and device geometries realized by using holographic polymer or dispersed liquid crystal materials.

However, these patented technologies as discussed above still have technical limitations that there is a relatively low coupling efficiency between the transmissions of two waveguides. As a result, performance degradation of the telecommunication networks often occurs due to coupling losses unless new configurations and designs are implemented to improve the coupling efficiency.

Therefore, a need still exists in the art to provide an innovative configurations and method of manufacturing and designing the wavelength selective optical devices to overcome such limitations.

SUMMARY OF THE INVENTION

Briefly, the present invention discloses a method for configuring a bus waveguide coupling to a bridge waveguide with a set of Bragg gratings disposed on either the bus waveguide or the bridge waveguide near a coupling section. The bus waveguide has an aspect ratio that is equal to or less than 0.75 where the aspect ratio is defined by the ratio between the thickness to the width of the bus waveguide. The coupling efficiency between the bridge and the bus waveguide is improved and the technical limitations as discussed above are resolved.

In accordance with the invention, the optical device includes a wavelength-elective optical transmission system. The wavelength-selective optical transmission system further includes a first waveguide for transmitting a multiplexed optical signal therethrough. The wavelength-selective optical transmission system further includes a second waveguide coupled to the first waveguide wherein a least one of the first and second waveguides having a set of wavelength-selective Bragg gratings disposed near a coupling section between the first and second waveguides. One of the first and second waveguides has an aspect ratio, i.e., a ratio of a thickness divided by a width, is no greater than 0.75.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

FIGS. 5A to 5B are schematic diagrams for showing the cross-section of the two different embodiments of the vertically stacked waveguides.

Figure 6:
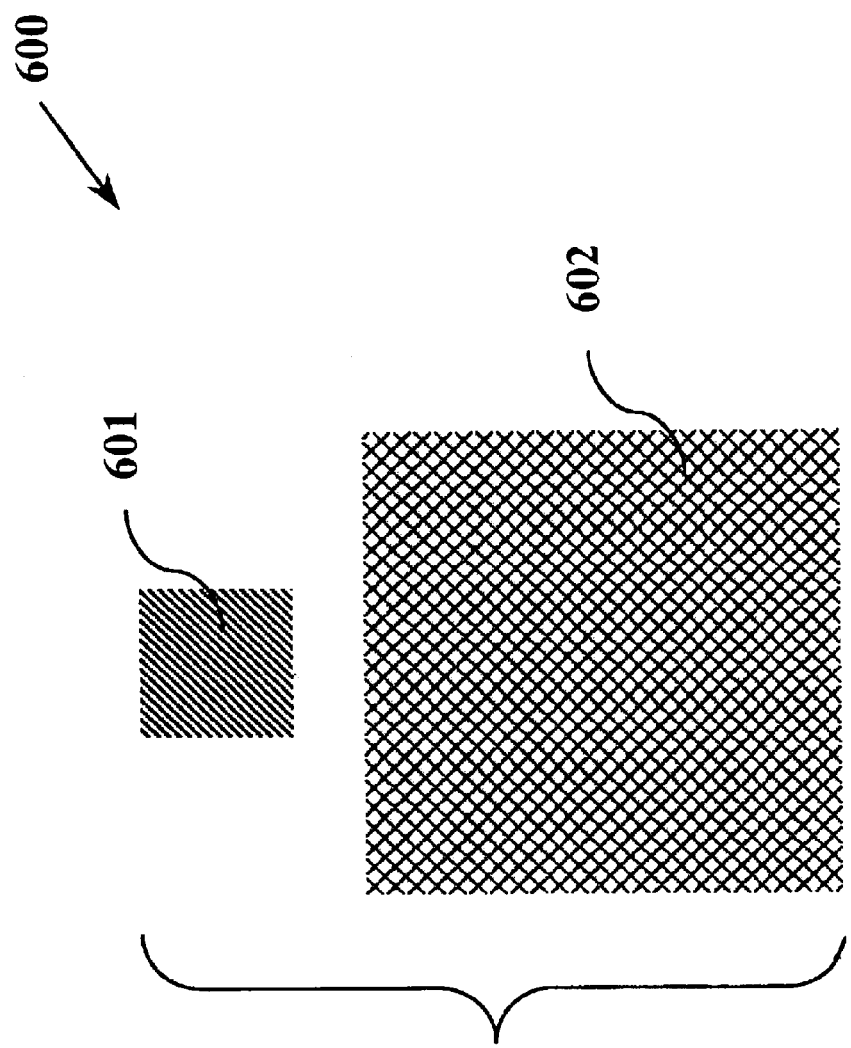
FIG. 6 is a schematic diagram for showing the cross-section of the vertically stacked waveguides in a conventional de sign where both the bridge and the bus waveguides are square waveguides.
Figure 7:
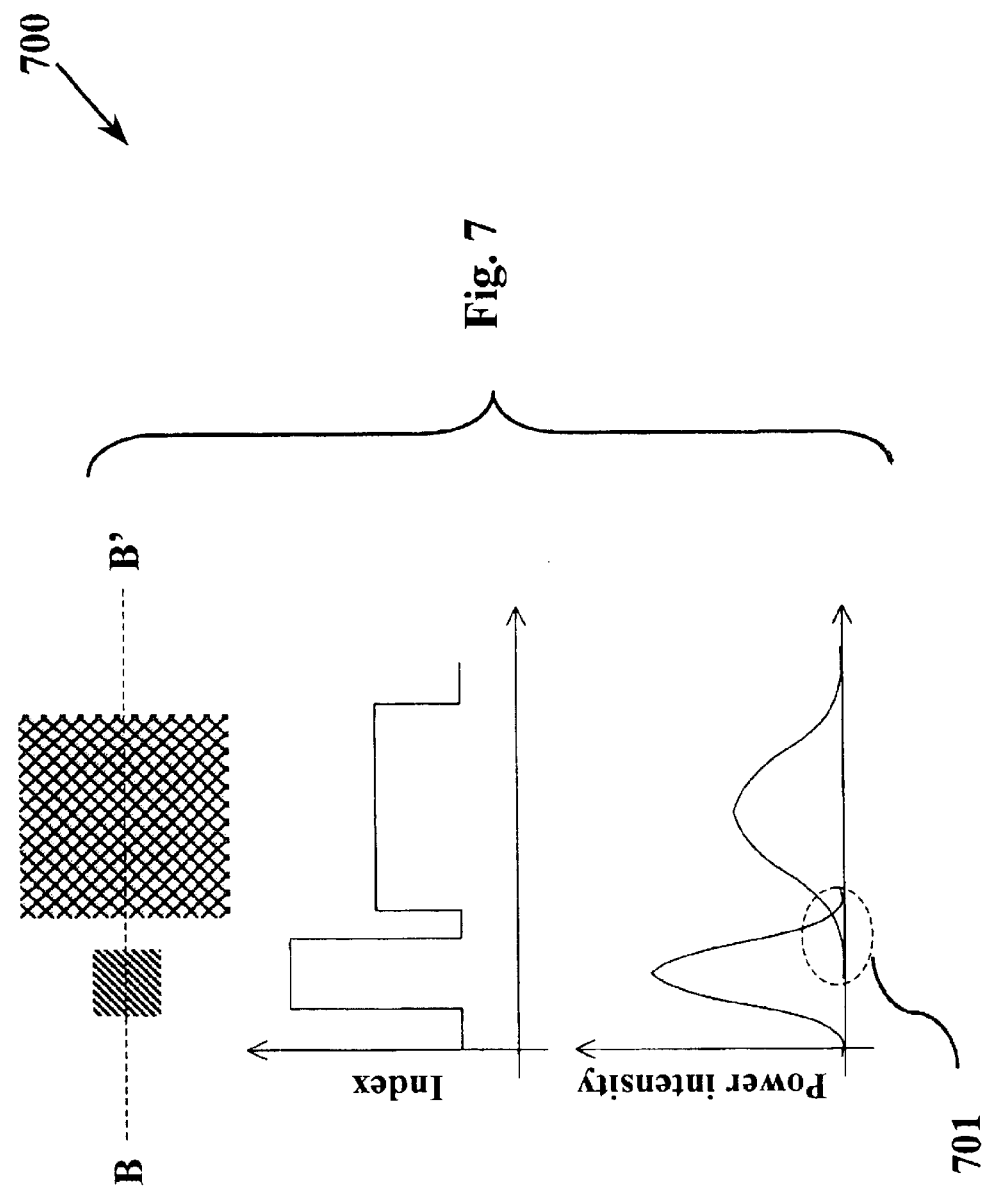

FIG. 7 consists of (a) a schematic diagram similar to FIG. 6 with a line B–B' drawn through the symmetrical center axis of the stacked waveguides, (b) a graph showing the refractive index variations along B–B', and (c) a graph showing the optical power intensity variations of the bridge waveguide and the bus waveguide along B–B'.

Figure 8:
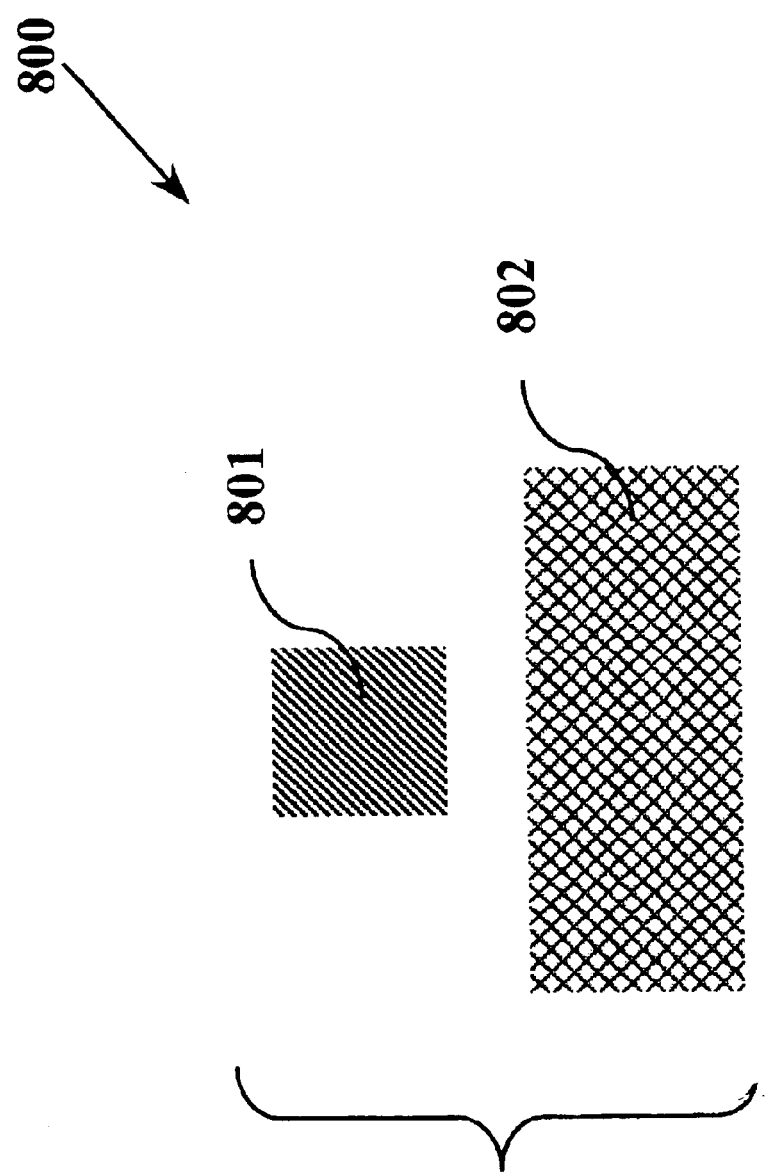

FIG. 8 is a schematic diagram for showing the cross-section of the vertically stacked waveguides in a design where the bridge waveguide is square but the bus waveguide is rectangular.

Figure 9:
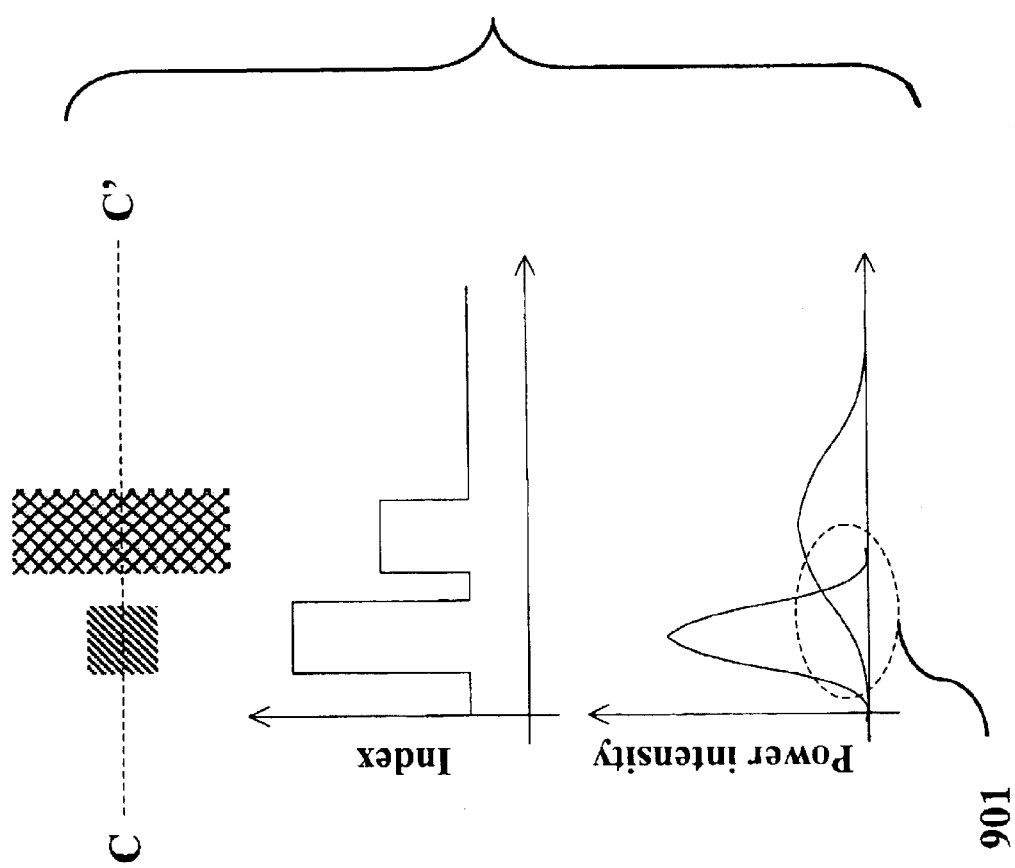

FIG. 9 consists of (a) a schematic diagram similar to FIG. 8 with a line C–C' drawn through the symmetrical center axis of the stacked waveguides, (b) a graph showing the refractive index variations along C–C', and (c) a graph showing the optical power intensity variations of the bridge waveguide and the bus waveguide along C–C'.

DETAILED DESCRIPTION OF THE PREFERRED EMBODIMENT

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention. Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
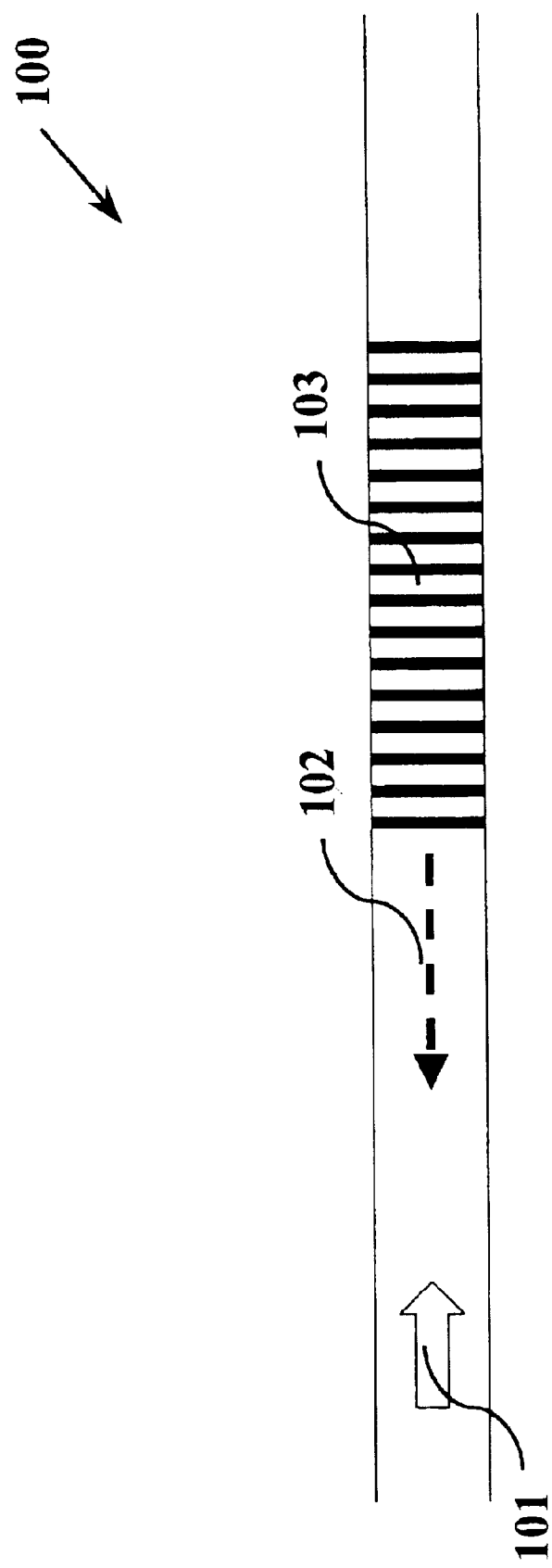
FIG. 1 is a schematic diagram showing a typical waveguide grating device with input signal and the reflective response propagating within the same waveguide.

A typical waveguide grating device is shown in FIG. 1 with input signal 101 and the reflective response 102 propagates within the same waveguide. Circulators, which are expensive, will be necessary in this case to extract the response signal.

Figure 2:
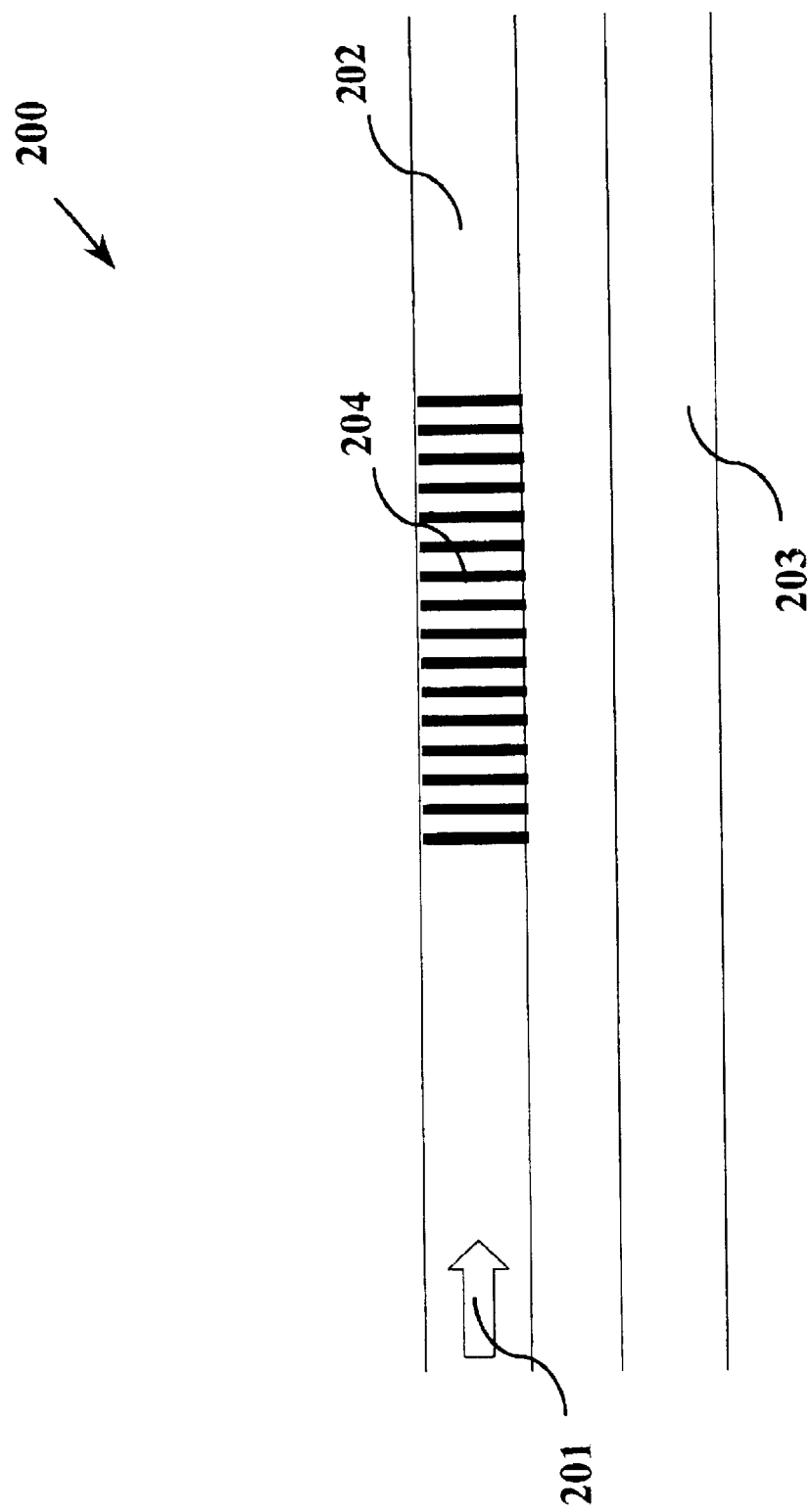
FIG. 2 is a schematic diagram of a grating assisted directional coupler device.

Referring to FIG. 2 for a schematic diagram for showing the functioning of a grating assisted directional coupler, in which waveguide 203 coupled with the wavelength selective waveguide 202. Sets of Bragg gratings 204 are formed on waveguide 202. A multiplexed optical signal 201 is transmitted in waveguide 202 over N wavelengths $\lambda_1$, $\lambda_2$, $\lambda_3$, ..., $\lambda_N$ where N is a positive integer. Contrary to the waveguide grating device shown in FIG. 1, this grating assisted directional coupler does not require the use of circulators for the extraction of the response signal.

Figure 3A:
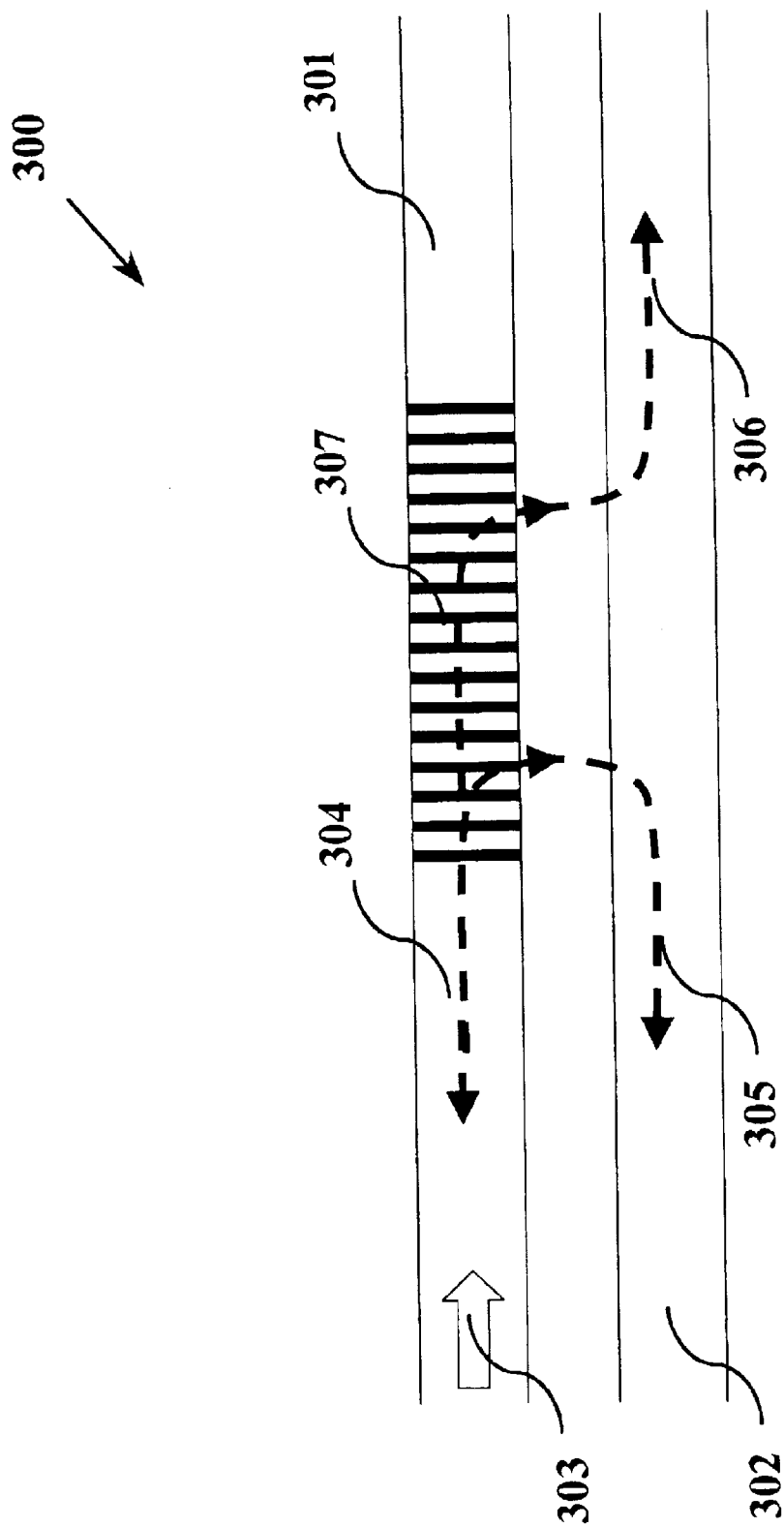
FIG. 3A illustrates a grating assisted directional coupler device design with gratings fabricated on the input waveguide.
Figure 3B:
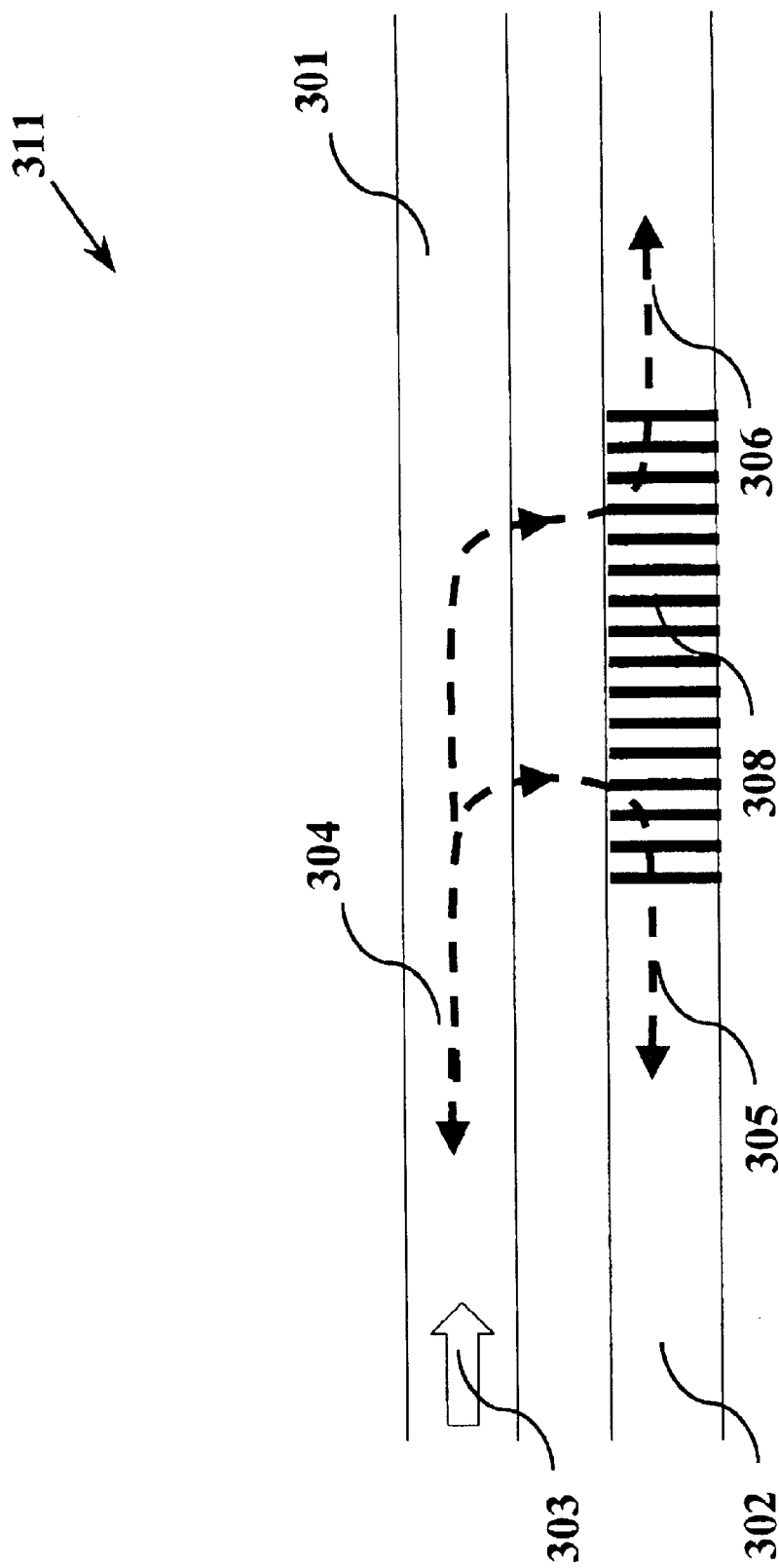
FIG. 3B illustrates a grating assisted directional coupler device design with gratings fabricated on the output waveguide.
Figure 3C:
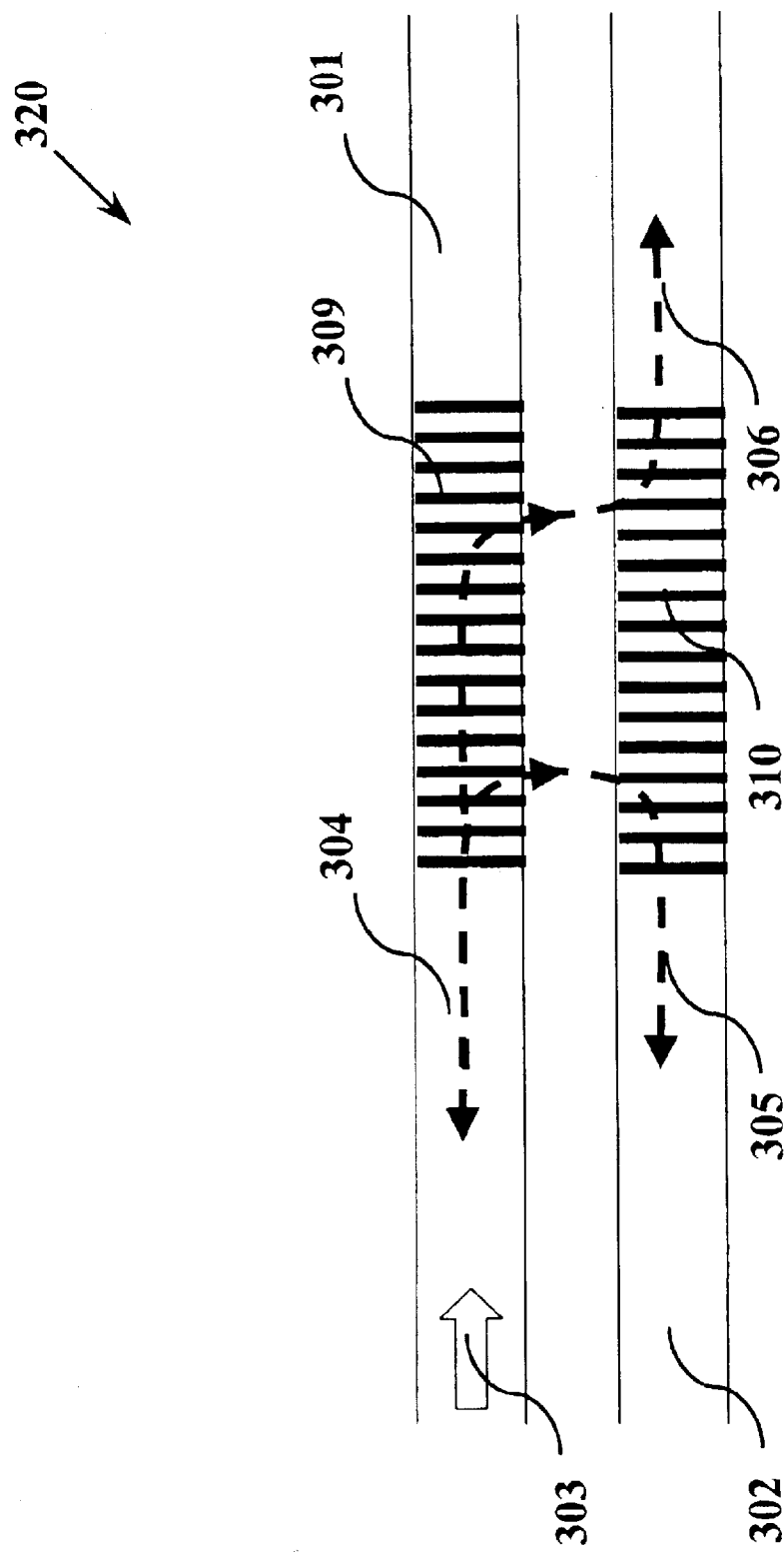
FIG. 3C illustrates a grating assisted directional coupler device design with gratings fabricated on both the input and output waveguides.

The three main classes of grating assisted directional coupler device design are illustrated in FIGS. 3A to 3C. In particular, (a) sets of Bragg gratings 307 are formed on waveguide 301 as in FIG. 3A, (b) sets of Bragg gratings 308 are formed on waveguide 302 as in FIG. 3B, and (c) sets of Bragg gratings 309 and 310 are formed on both waveguides 301 and 302 as in FIG. 3C.

Other designs where the Bragg gratings are formed in the cladding, although not explicitly depicted here, are feasible and therefore implied.

Referring to FIG. 3A, an input optical signal 303 is transmitted in waveguide 301 over N wavelengths $\lambda_1$, $\lambda_2$, $\lambda_3$, ..., $\lambda_N$ where N is a positive integer, which is coupled to waveguide 302 such that (a) a contra-directional coupling signal 305 with a central wavelength $\lambda_i$ particular to the Bragg gratings is guided into waveguide 302, (b) a co-directional coupling signal 306 with a central wavelength $\lambda_j$ particular to the Bragg gratings 307 is guided into waveguide 302, and (c) a direct Bragg reflective signal 304 with a central wavelength $\lambda_k$ particular to the Bragg gratings is guided into waveguide 301.

If the grating assisted directional coupler device is designed such that only contra-directional coupling is to be utilized, wavelength $\lambda_i$ would be one of the aforementioned N wavelengths but wavelengths $\lambda_j$ and $\lambda_k$ would be outside of the set of aforementioned N wavelengths. In other words, signals 304 and 306 would carry no optical power. The remainder optical signal of the wavelengths $\lambda_1, \lambda_2, \ldots, \lambda_{i-1}, \lambda_{i+1}, \ldots, \lambda_N$ is not affected and continues to propagate along waveguide 301.

For the purpose of signal transmission in the telecommunication network, optical signals of certain range of wavelengths are employed, e.g., C-band optical signals are limited within a range of 1529.75~1569.59 nm. It is a common practice to assume some margin to allow for random fluctuations in process and/or material non-uniformity. In the case when this margin is set at 5 nm, for example, one may consider setting as set forth below:

$\lambda_{min}$=1529.75−5=1524.75 nm ; and $\lambda_{max}$=1569.59+5=1574.59 nm

The gratings structure of our switches is designed such that contra-directional coupling, co-directional coupling and direct Bragg reflection occur at specific wavelengths. Depending on which coupling mechanism is to be utilized, the specific wavelength corresponding to the particular coupling mechanism falls within the bandwidth of interest, (e.g. the C-band). For example, if only contra-directional coupling is to be utilized, it is desirable that the wavelengths specific to co-directional coupling and direct Bragg reflection are outside of the bandwidth of interest.

Similar considerations are applicable for designs where the Bragg gratings 308 are formed only on waveguide 302 as in FIG. 3B, designs where the Bragg gratings 309 and 310 are formed on both waveguides 301 and 302 as in FIG. 3C, and designs (although not depicted here) where the Bragg gratings are formed in the cladding.

In order for the above conditions pertaining to a contra-directional grating assisted waveguide coupler to be satisfied, it has been disclosed elsewhere that if the propagation constants of waveguide 301 and waveguide 302 are $\beta_1$ and $\beta_2$, respectively, then they must be significantly different, i.e. $\beta_1 \neq \beta_2$. Moreover, if the waveguides shown in FIGS. 3A to 3C are fabricated on the same substrate and are co-planar, there are two methods to achieve the $\beta_1 \neq \beta_2$ condition:

(a) waveguides fabricated with material with different refractive indices; or (b) waveguides fabricated with same material but with significantly different geometry.

Method (a) is expensive and difficult to realize since extra masks and process steps are required. Method (b) is very limited due to two reasons. First, the thicknesses of both waveguides are necessarily similar as the process is complicated otherwise. By adjusting waveguide widths alone the difference in propagation constants is not expected to be large enough to satisfy any of the selection rules.

Several embodiments have been proposed elsewhere in order to circumvent these limitations. Referring to FIGS. 4A to 4B and FIGS. 5A to 5B, it has been suggested that the two waveguides in a grating assisted directional coupler device be fabricated on two different levels, that is, a so-called vertically stacked waveguide structure.

By fabricating the input/output waveguides and the coupling waveguide on two different levels, design of each type of waveguides can be independent of each other. For example, the dimensions of the coupling waveguide can be very different from the input/output waveguides, and each type of waveguides can be fabricated using different material. An additional advantage is that the gap between the input/output waveguide and the coupling waveguide, which significantly controls the grating assisted directional coupler device characteristics, can be controlled precisely.

Figure 4A:
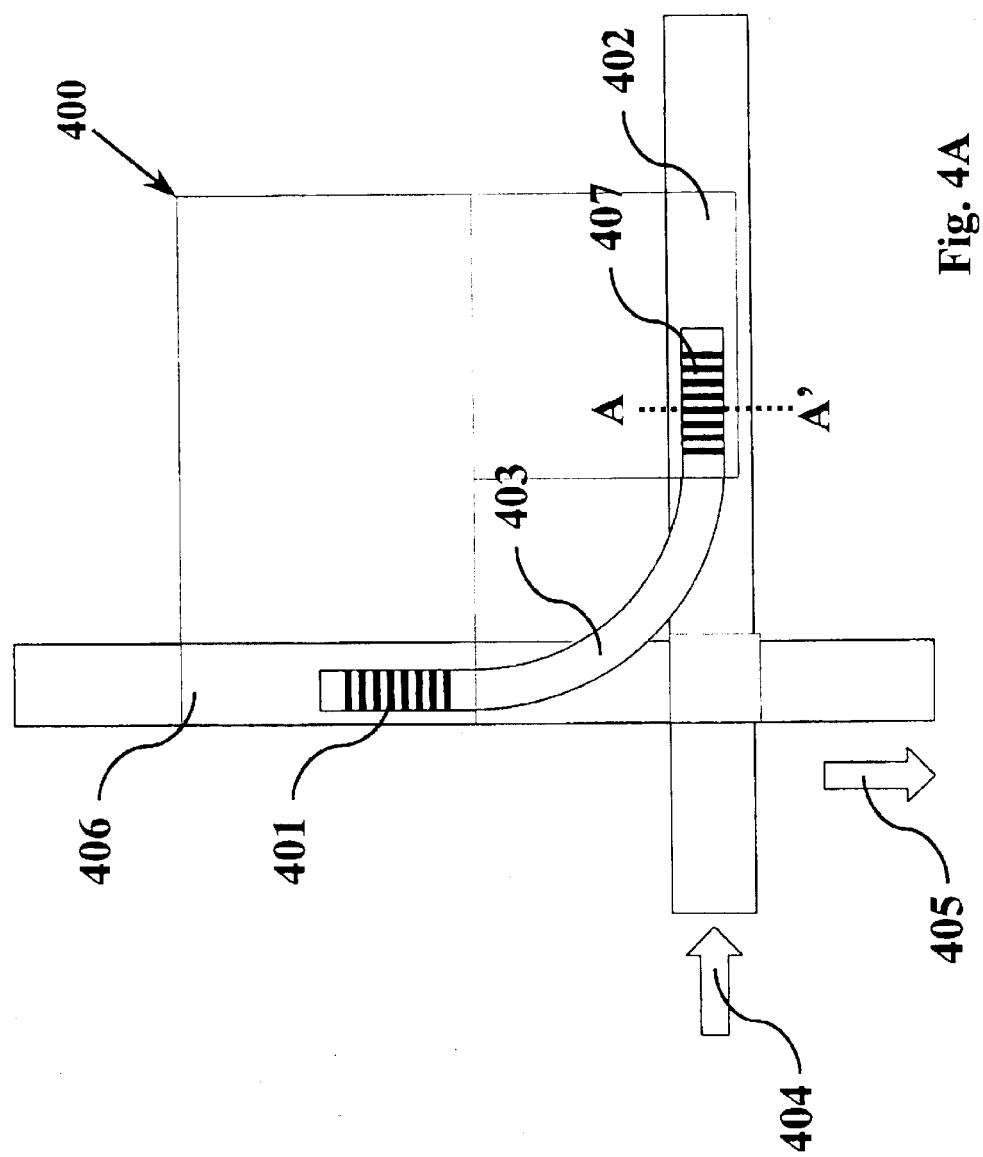
FIGS. 4A to 4B are schematic diagrams for showing a design of a grating assisted directional coupler device based on vertically stacked waveguides where the input bus waveguide and the output bus waveguide crosses each other in a perpendicular fashion.

Referring to FIG. 4A, a schematic diagram of a grating assisted directional coupler device based on vertically stacked waveguides is shown. In this figure, the input bus waveguide 402 and the output bus waveguide 406, and the bridge waveguide 403, each of which being a single-mode waveguide, are formed on two different planar levels, e.g., with the bridge waveguide either (a) above or (b) beneath both the input and the output bus waveguides.

Figure 5B:
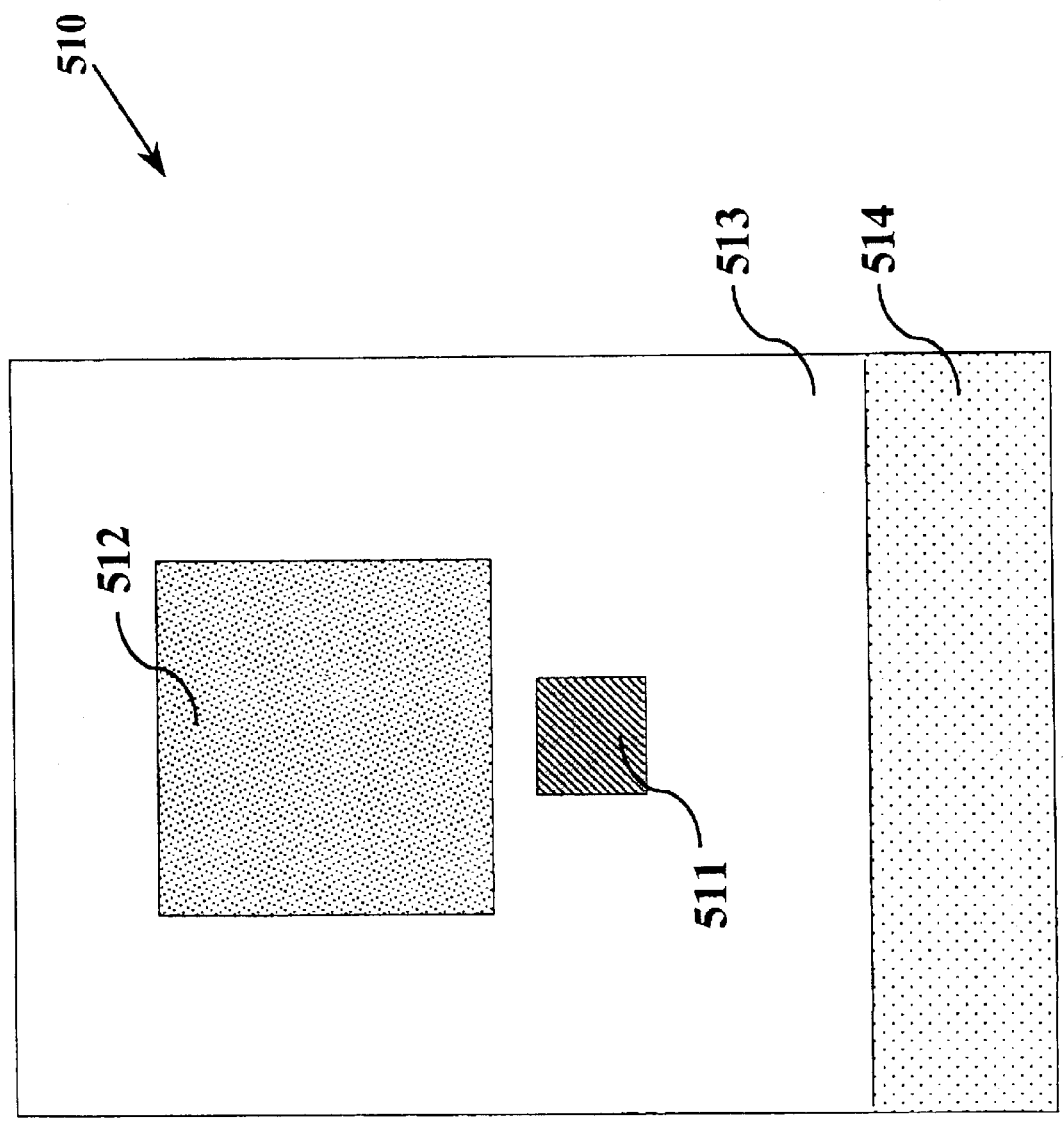

As an illustration, FIG. 5A shows the cross sectional view (along A–A' in FIG. 4A) when the bridge waveguide is above the bus waveguides. Similarly, FIG. 5B shows the cross sectional view (along A–A' in FIG. 4A) when the bridge waveguide is beneath the bus waveguides. It should be specified that in these figures, both 501 and 511 denote the bridge waveguide, both 502 and 512 denote the bus waveguide, both 503 and 513 denote the cladding, and both 504 and 514 denote the substrate.

Referring to FIG. 4A again, an optical signal 404 with a multitude of wavelengths $\lambda_1, \lambda_2, \lambda_3, \ldots, \lambda_N$ (where N is a positive integer) is transmitted in the input bus waveguide 402 which is coupled to the bridge waveguide 403. In this design, a contra-directional coupling signal with a central wavelength $\lambda_1$ particular to the Bragg gratings 407 is guided into waveguide 403. The remainder optical signal of the wavelengths $\lambda_1, \lambda_2, \ldots, \lambda_{i-1}, \lambda_{i+1}, \ldots, \lambda_N$ is not affected and continues to propagate along waveguide 402.

As it is designed also that the Bragg gratings 401 are identical to the Bragg gratings 407, the signal (with central wavelength $\lambda_1$) is then coupled in a contra-directional manner to the output bus waveguide 406. It propagates along the bus waveguide 406 and emerges as the output signal 405.

With this configuration, the bridge waveguide 403 can be conveniently manufactured with different material having a different refraction index from the material as that employed for making input bus waveguide 402 and output bus waveguide 406.

Figure 4B:
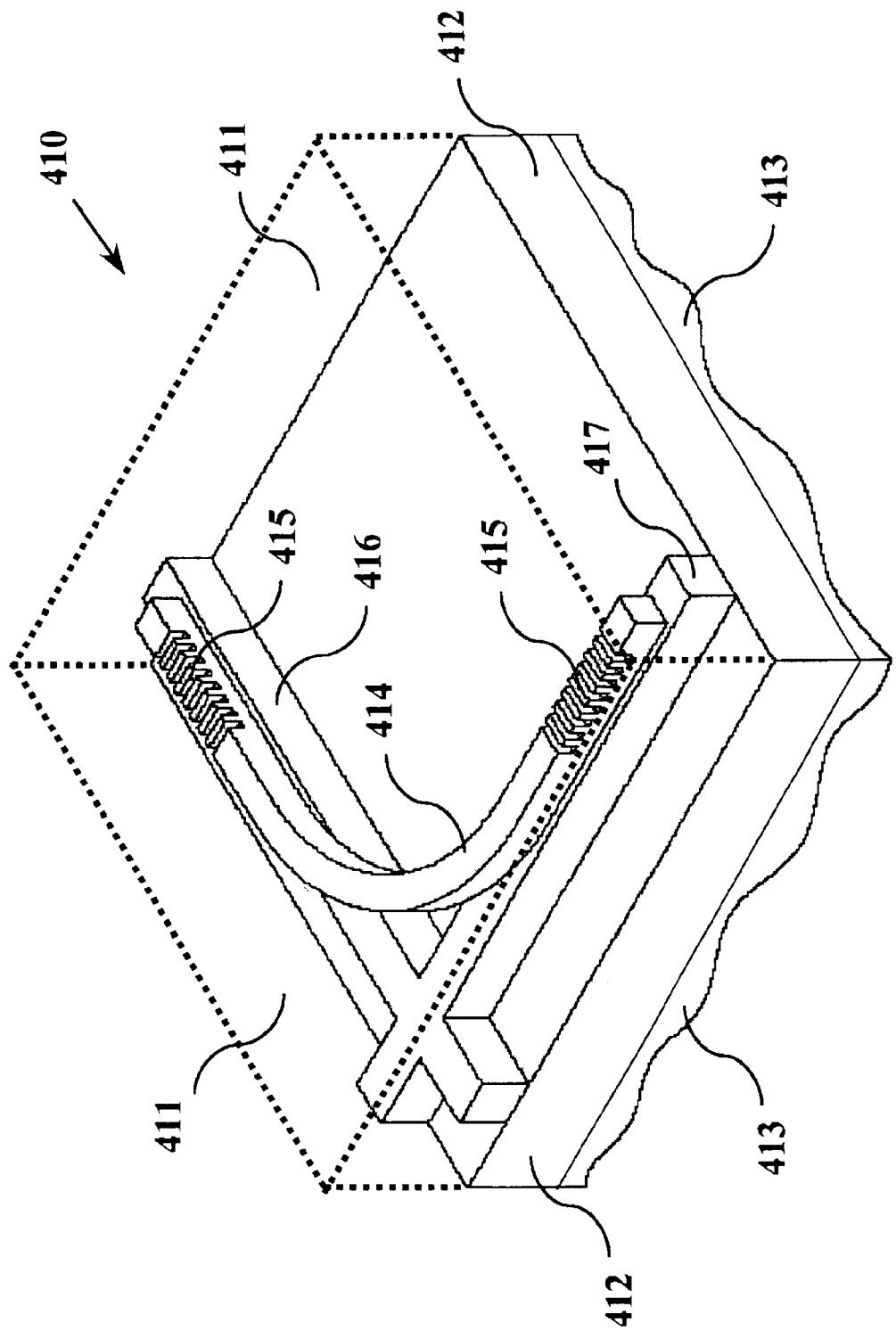

FIG. 4B is a perspective view of the design based on FIG. 4A in which the bridge waveguide is disposed on top of both the input and output bus waveguides. In this grating assisted directional coupler design, the input bus waveguide 416 and the output bus waveguide 417 are disposed beneath the bridge waveguide 414. The cross-sectional view is as shown in FIG. 5A. The gratings 415, which are on both ends of the bridge waveguide 414, are identical. The top clad 411 and the bottom clad 412, which are typically made of silica material with same or slightly different refractive indices, are deposited on a substrate 413 which is typically silicon. It should be added that the configurations shown in FIG. 4B have another advantage that the optical device can be manufactured with a more compact size and often with better and more manageable shape and form to more conveniently fit into different system configurations.

Referring to FIGS. 6 to 9 for further improvement of coupling efficiency between the bus waveguide and the bridge waveguide. FIG. 6 shows the conventional configuration of a bridge waveguide 601 and a bus waveguide 602 in a grating assisted directional coupler device. The bus waveguide is typically made of silica with a refractive index difference between the core and the cladding being 0.75%, and it has a square cross section of approximately 6 micrometers on each side. The bridge waveguide is typically made of material such that the refractive index difference between the core and the silica cladding, ranges from 0.75% to 30%. The cross section of the bridge waveguide is typically 2 micrometers on each side.

FIG. 7 furthermore shows, respectively, the refractive index variations and the optical power intensity variations along the symmetrical center axis B–B'. Typically the optical power intensity variations in the bridge waveguide and the bus waveguide do overlap 701 (indicated by an oval area enclosed in the dotted line in FIG. 7). In conventional design where the bus waveguide is typically 6 micrometers on each side, most of the optical power is confined within the waveguide. As a result, the spread of the optical power outside of the bus waveguide is insignificant and, as a result, the overlap 701 is small. As the coupling efficiency is proportional to this overlap 701, to improve the coupling efficiency it is necessary to increase the overlap 701.

Referring to FIG. 8, a schematic in which the new dimensions of the bridge waveguide 801 versus the bus waveguide 802 is shown. It is proposed that the aspect ratio (thickness divided by width) of the bus waveguide 802 to be reduced to no more than 0.75.

When the thickness of the bus waveguide is reduced, the Goos-Haenchen shift (see, for example, Section IIB of Kogelnik, "An Introduction to Integrated Optics," *IEEE Transactions on Microwave Theory and Techniques*, Vol. 23, No. 1, pp. 2–16, January 1975) becomes more pronounced and, consequently, the guided optical wave becomes less confined within the waveguide. The spread of the optical power outside of the bus waveguide becomes more significant as a result. As the overlap 701, which is between the optical power intensity variations in the bridge waveguide and the bus waveguide increases, enhancement of coupling between the two waveguides follows.

To illustrate this point, as in FIG. 7, in FIG. 9 variations of the refraction index and the optical power intensity variations along the symmetrical center axis C–C' are shown. As shown in FIG. 9, the optical power intensity variations within the bus waveguide 802 has a wider spread when compared to the conventional design as that shown in FIG. 7, e.g., the bus waveguide 602. As mentioned earlier, the coupling efficiency is dependent on the extent of the overlap of the optical power intensity variation between the bus waveguide 802 and the bridge waveguide 801. An oval area enclosed in the dotted line in FIG. 7 and FIG. 9, respectively, specifically highlights the overlap areas 701 and 901. The coupling efficiency of the new configuration according to FIG. 9 is therefore improved.

According to the above descriptions and drawings, this invention discloses a wavelength-selective optical transmission system that includes a first waveguide coupled to a second waveguide through a set of Bragg gratings wherein the first and second waveguides having different aspect ratios defined by a waveguide thickness divided by a waveguide width. In a preferred embodiments, one of the first and second waveguides having an aspect ratio equal to or less than 0.75. In a preferred embodiment, the first waveguide has a larger cross sectional area than the second waveguide. In another preferred embodiment, the first waveguide has a smaller cross sectional area than the second waveguide. In another preferred embodiment, the first waveguide has a rectangular cross sectional area. In another preferred embodiment, the second waveguide has a square cross sectional area. In another preferred embodiment, the first waveguide has a non-square cross sectional area with a width W and thickness T where and an aspect ratio T/W ranging from 0.8 to 0.01 and the second waveguide has a substantially square cross sectional area having a width and thickness equal to WT and WT is equal to or greater than T. In another preferred embodiment, the first waveguide and the second waveguide are composed of a same material and have two different shapes of cross sectional areas. In another preferred embodiment, the first waveguide and the second waveguide have two different optical propagation constants. In another preferred embodiment, the Bragg gratings are disposed on the first waveguide. In another preferred embodiment, the Bragg gratings are disposed on the second waveguide. In another preferred embodiment, the Bragg gratings are disposed on the first and second waveguides. In another preferred embodiment, the Bragg gratings are disposed on a cladding surrounding the first waveguide. In another preferred embodiment, the Bragg gratings are disposed on a cladding surrounding the second waveguide. In another preferred embodiment, the Bragg gratings are disposed on a cladding in the gap between the first and second waveguides.

In additional to the advantage of improved coupling with the bridge waveguide 801, the bus waveguide 802 also has better coupling efficiency with input/output optical fibers. As a result, reduced insertion loss due to input/output is expected. The reason is as follows. The spotsize of an optical fiber, which is a measure of the spread of the optical field distribution within the fiber, is typically significantly larger than the spotsize of the bus waveguide with conventional design. To improve the coupling efficiency, it is necessary to improve upon the mismatch between the spotsizes (see, for example, Kawano et al, "3-D semivectorical beam propagation analysis of a spot size-converter-integrated laser diode in the 1.3-$\mu$-wavelength region," *IEEE Photonics Technology Letters*, Vol. 9, No. 1, pp. 19–21, January 1997). With the bus waveguide thickness reduced (as in FIG. 8), as discussed earlier the spread of the optical field distribution within the bus waveguide increases. The coupling efficiency is enhanced as a result.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A wavelength-selective optical transmission system comprising:

a first waveguide for transmitting a multiplexed optical signal therethrough;

a second waveguide coupled to said first waveguide wherein a least one of said first and second waveguides having a set of wavelength-selective Bragg gratings disposed near a coupling section between said first and second waveguides wherein one of said first and second waveguides having an aspect ratio defined by a thickness divided by a width is no greater than 0.75.

2. The wavelength-selective optical transmission system of claim 1 wherein:

said first waveguide having a larger cross sectional area than said second waveguide.

3. The wavelength-selective optical transmission system of claim 1 wherein:

said first waveguide having a smaller cross sectional area than said second waveguide.

4. The wavelength-selective optical transmission system of claim 1 wherein:

said first waveguide having a rectangular cross sectional area.

5. The wavelength-selective optical transmission system of claim 1 wherein:

said second waveguide having a square cross sectional area.

6. The wavelength-selective optical transmission system of claim 1 wherein:

said first waveguide having a non-square cross sectional area with a width W and thickness T where and an aspect ratio T/W ranging from 0.8 to 0.01 and said second waveguide having a substantially square cross sectional area having a width and thickness equal to WT and WT is equal to or greater than T.

7. The wavelength-selective optical transmission system of claim 1 wherein:

said first waveguide and said second waveguide are composed of a same material and having two different shapes of cross sectional areas.

8. The wavelength-selective optical transmission system of claim 1 wherein:

said first waveguide and said second waveguide having two different optical propagation constants.

9. The wavelength-selective optical transmission system of claim 1 wherein:

said Bragg gratings disposed on said first waveguide.

10. The wavelength-selective optical transmission system of claim 1 wherein:

said Bragg gratings disposed on said second waveguide.

11. The wavelength-selective optical transmission system of claim 1 wherein:

said Bragg gratings disposed on said first and second waveguides.

12. The wavelength-selective optical transmission system of claim 1 wherein:

said Bragg gratings disposed on a cladding surrounding said first waveguide.

13. The wavelength-selective optical transmission system of claim 1 wherein:

said Bragg gratings disposed on a cladding surrounding said second waveguide.

14. The wavelength-selective optical transmission system of claim 1 wherein:

said Bragg gratings disposed on a cladding in the gap between said first and second waveguides.

15. A method for configuring a wavelength-selective optical transmission system comprising:

transmitting a multiplexed optical signal through a first waveguide and coupling a second waveguide to said first waveguide; and forming a set of wavelength-selective Bragg gratings on a least one of said first and second waveguides near a coupling section between said first and second waveguides and configuring one of said first and second waveguides having an aspect ratio defined by a thickness divided by a width is no greater than 0.75.

16. The method of claim 15 wherein:

said step of coupling said second waveguide to said first waveguide further comprising a step of configuring said first waveguide having a larger cross sectional area than said second waveguide.

17. The method of claim 15 wherein:

said step of coupling said second waveguide to said first waveguide further comprising a step of configuring said first waveguide having a smaller cross sectional area than said second waveguide.

18. The method of claim 15 wherein:

said step of coupling said second waveguide to said first waveguide further comprising a step of configuring said first waveguide with a rectangular cross sectional area.

19. The method of claim 15 wherein:

said step of coupling said second waveguide to said first waveguide further comprising a step of configuring said first waveguide with a square cross sectional area.

20. The method of claim 15 wherein:

said step of coupling said second waveguide to said first waveguide further comprising a step of configuring said first waveguide having a non-square cross sectional area with a width W and thickness T where and an aspect ratio T/W ranging from 0.8 to 0.01 and said second waveguide having a substantially square cross sectional area having a width and thickness equal to WT and WT is equal to or greater than T.

21. The method of claim 15 wherein:

said step of coupling said second waveguide to said first waveguide further comprising a step of configuring said first waveguide and said second waveguide composed of a same material and having two different shapes of cross sectional areas.

22. The method of claim 15 wherein:

said step of coupling said second waveguide to said first waveguide further comprising a step of configuring said first waveguide and said second waveguide having two different optical propagation constants.

23. The method of claim 15 wherein:

said step of forming wavelength-selective Bragg gratings on a least one of said first and second waveguides further comprising a step of forming said set of Bragg gratings on said first waveguide.

24. The method of claim 15 wherein:

said step of forming wavelength-selective Bragg gratings on a least one of said first and second waveguides further comprising a step of forming said set of Bragg gratings on said second waveguide.

25. The method of claim 15 wherein:

said step of forming wavelength-selective Bragg gratings on a least one of said first and second waveguides further comprising a step of forming said set of Bragg gratings on said first and second waveguides.

26. The method of claim 15 wherein:

said step of forming wavelength-selective Bragg gratings on a least one of said first and second waveguides further comprising a step of forming said set of Bragg gratings on a cladding surrounding said first waveguide.

27. The method of claim 15 wherein:

said step of forming wavelength-selective Bragg gratings on a least one of said first and second waveguides further comprising a step of forming said set of Bragg gratings on a cladding surrounding said second waveguide.

28. The method of claim 15 wherein:

said step of forming wavelength-selective Bragg gratings on a least one of said first and second waveguides further comprising a step of forming said set of Bragg gratings on a cladding in the gap between said first and second waveguides.

29. A wavelength-selective optical transmission system comprising:

a first waveguide coupled to a second waveguide through a set of Bragg gratings wherein said first and second waveguides having different aspect ratios defined by a waveguide thickness divided by a waveguide width.

30. A wavelength-selective optical transmission system of claim 29 wherein:

One of said first and second waveguides having an aspect ratio equal to or less than 0.75.

* * * * *